(12) United States Patent
Kajiwara et al.

(10) Patent No.: US 6,502,874 B2
(45) Date of Patent: Jan. 7, 2003

(54) COUPLING STRUCTURE OF SHOCK TRANSMITTING MEMBER AND SHOCK ABSORBING MEMBER, AND BUMPER

(75) Inventors: Kazutomo Kajiwara, Nagoya (JP); Yuzo Konishi, Toyota (JP); Kiyohito Morimoto, Toyota (JP); Seiji Sakai, Toyota (JP); Terutsugu Gotanda, Kariya (JP); Shinichi Haneda, Anjo (JP); Kazuo Mori, Kariya (JP); Kazunari Azuchi, Himi (JP); Kazunobu Nuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/024,555

(22) Filed: Dec. 21, 2001

(65) Prior Publication Data
US 2002/0079711 A1 Jun. 27, 2002

(30) Foreign Application Priority Data
Dec. 25, 2000 (JP) .......................................... 2000-392523

(51) Int. Cl.⁷ ............................................... B60R 19/34
(52) U.S. Cl. ........................ 293/133; 293/120; 293/132; 293/122; 296/188
(58) Field of Search ................. 293/133, 120, 293/132, 122; 296/188, 189

(56) References Cited

U.S. PATENT DOCUMENTS

| | | | | |
|---|---|---|---|---|
| 3,897,095 A | * | 7/1975 | Glance et al. | 293/120 |
| 4,154,469 A | * | 5/1979 | Goupy et al. | 293/133 |
| 4,200,318 A | * | 4/1980 | Gute et al. | 293/136 |
| 4,252,355 A | * | 2/1981 | Goupy et al. | 293/132 |
| 4,328,986 A | * | 5/1982 | Weller et al. | 293/120 |
| 4,348,042 A | * | 9/1982 | Scrivo | 293/120 |
| 4,413,856 A | * | 11/1983 | McMahan et al. | 296/188 |
| 4,597,601 A | * | 7/1986 | Manning | 293/133 |
| 4,940,270 A | * | 7/1990 | Yamazaki et al. | 293/132 |
| 4,998,761 A | * | 3/1991 | Bayer et al. | 293/121 |
| 5,056,840 A | * | 10/1991 | Eipper et al. | 293/133 |
| 5,080,411 A | * | 1/1992 | Stewart et al. | 293/122 |
| 5,201,912 A | * | 4/1993 | Terada et al. | 293/133 |
| 5,636,866 A | * | 6/1997 | Suzuki et al. | 296/189 |
| 5,772,267 A | * | 6/1998 | Heim et al. | 293/133 |
| 5,876,078 A | * | 3/1999 | Miskech et al. | 293/133 |
| 6,000,738 A | * | 12/1999 | Steart et al. | 293/120 |
| 6,003,930 A | | 12/1999 | Frank et al. | |
| 6,059,331 A | * | 5/2000 | Mori | 293/133 |
| 6,068,330 A | * | 5/2000 | Kasuga et al. | 296/188 |
| 6,179,355 B1 | * | 1/2001 | Chou et al. | 293/133 |
| 6,203,098 B1 | * | 3/2001 | Motozawa et al. | 293/133 |
| 6,227,582 B1 | * | 5/2001 | Ichien | 293/133 |
| 6,318,775 B1 | * | 11/2001 | Heatherington et al. | 293/132 |
| 6,343,820 B1 | * | 2/2002 | Pedersen | 293/122 |
| 6,412,836 B1 | * | 7/2002 | Mansoor et al. | 293/133 |
| 2002/0063433 | * | 5/2002 | Gotanda et al. | 293/133 |

FOREIGN PATENT DOCUMENTS

| | | |
|---|---|---|
| DE | 195 45 069 | 4/1997 |
| DE | 195 17 922 | 11/1998 |
| GB | 2 299 551 | 10/1996 |
| JP | 05-065076 | 3/1993 |
| JP | 07-145842 | 6/1995 |
| JP | 07-145843 | 6/1995 |
| JP | 08-216917 | 8/1996 |
| JP | 11-208518 | 8/1999 |

* cited by examiner

*Primary Examiner*—Kiran B. Patel
(74) *Attorney, Agent, or Firm*—Kenyon & Kenyon

(57) ABSTRACT

Load is applied to a bumper reinforce. Two hollow crash boxes are coupled to the bumper reinforce. Each crash box has a substantially constant cross section, an axis and an open end. When load is applied to the bumper reinforce, each crash box is plastically deformed in the axial direction for absorbing the load. The bumper reinforce includes projections. Each projection corresponds to one of the crash boxes and faces part of the open end of the corresponding crash box. The projections reduce the load at the beginning of plastic deformation.

3 Claims, 4 Drawing Sheets

COUPLING STRUCTURE OF SHOCK TRANSMITTING MEMBER AND SHOCK ABSORBING MEMBER, AND BUMPER

BACKGROUND OF THE INVENTION

The present invention relates to a coupling structure of shock transmitting member and a shock absorbing member, and to a bumper.

A shock absorbing member that includes a hollow shock transmitting member is known in the art. The shock transmitting member has a substantially constant cross section. When receiving an axial load, the transmitting member is plastically deformed and absorbs the impact energy. In such a shock absorbing member; a significantly great axial load needs to be applied to the absorbing member as shown in FIG. 4 to initiate plastic deformation (initial buckle deformation). Once a plastic deformation is started, the absorbing member consecutively repeats buckle deformations by relatively small axial loads with its shape turning into that of a bellows. In this manner, the absorbing member absorbs shock.

Such axial loads are transmitted to the outside through the shock absorbing member. Therefore, the great load at the initial stage is also transmitted to the outside through the absorbing member. Thus, the axial load that initiates plastic deformation (initial buckle deformation) of the shock absorbing member needs to be reduced. Accordingly, Japanese Unexamined Patent Publications Nos. 5-65076, 7-145842, 7-145843, 8-216917, 11-208518 disclose devices for reducing such load.

In the above publications, the shock absorbing members have a portion for concentrating stress, or a weakened portion. Plastic deformation due to axial load starts from the weakened portion, which reduces the axial load for initiating the plastic deformation. However, each of the shock absorbing members of the publications has more than one of the following drawbacks.

(1) Machining is complicated and difficult.
(2) Axial load for initiating plastic deformation is not sufficiently reduced.
(3) Due to design and structure, stable plastic deformation characteristics cannot be obtained.
(4) If holes are formed, consecutive buckle deformations create ruptures, which hinder reliable plastic deformations.
(5) Weld beads degrade the mechanical characteristics of a material. Therefore, when receiving a tension load, the shock absorbing member is likely to be broken.
(6) Attaching beads to a hollow body, the interior of which is divided into sections by walls, is complicated and difficult.
(7) Machining, such as cutting, increases the costs.

Accordingly, it is difficult to obtain stable and satisfactory characteristics and effective productivity at the same time.

SUMMARY OF THE INVENTION

Accordingly, it is an objective of the present invention to provide a coupling structure of a shock transmitting member and a shock absorbing member, and a bumper that improve the productivity and reduce axial load for initiating plastic deformation.

To achieve the foregoing and other objectives and in accordance with the purpose of the present invention, a coupling structure of shock transmitting member and shock absorbing member is provided. The coupling structure includes a shock transmitting member, to which load is applied, a hollow shock absorbing member, and a coupling structure. The hollow shock absorbing member has a substantially constant cross section, an open end, and an axis extending from the open end. The shock absorbing member is plastically deformed in the axial direction for absorbing load applied to the shock transmitting member. The coupling structure couples the shock transmitting member and the shock absorbing member. The shock transmitting member includes a projection, which faces part of the open end of the shock absorbing member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4. In this embodiment, the present invention is applied to the front portion of a vehicle.

Figure 2:
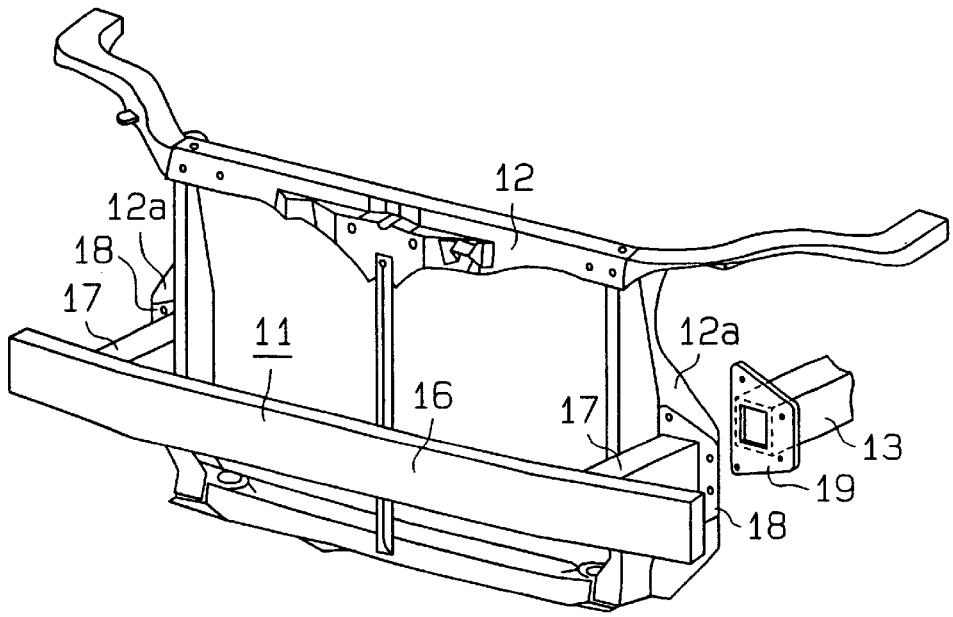
FIG. 2 is a perspective view illustrating the shock absorbing member of FIG. 1, when applied to the front portion of an automobile.

FIG. 2 is a perspective view illustrating the front portion of the vehicle, to which the present embodiment is applied. A bumper frame 11, which is the framework of a bumper, a radiator support 12, and a pair of hollow side members 13, which form part of the vehicle body, are located at the front portion.

The bumper frame 11 includes a bumper reinforce 16 and a pair of shock absorbing members, which are crash boxes 17 in this embodiment. The bumper reinforce 16 extends laterally with respect to the vehicle. Each crash box 17 is coupled to one end of the bumper reinforce 16. The axis of each crash box 17 extends toward the rear of the vehicle. A crash box bracket 18 for bolts is located at the rear end of each crash box 17.

The radiator support 12 is substantially rectangular and fixed to the vehicle body. A pair of radiator support brackets 12a protrudes laterally from the sides of the radiator support 12. Each radiator support bracket 12a corresponds to a crash box bracket 18. Each crash box bracket 18 faces a radiator support bracket 12a.

Each side member 13 has a rectangular cross section and the axis of the side member 13 is aligned with that of the corresponding crash box 17. A bolt bracket 19 is located at the front end of each side member 13. The bolt bracket 19 corresponds to the crash box bracket 18 of the corresponding crash box 17. Thus, the bumper frame 11 is fixed to the vehicle body by securing the crash box brackets 18 of the crash boxes 17 to the bolt brackets 19 of the side members 13 through the radiator support brackets 12a of the radiator support 12.

If a shock due to a collision is applied to the vehicle from the front, the shock is transmitted to the side members 13 of the vehicle body through the bumper reinforce 16 of the bumper frame 11 and the crash boxes 17. At this time, the crash boxes 17 repeat buckle deformations along their axes and absorb the shock that is transmitted to the body. Accordingly, the shock that is applied to the body and the passengers is absorbed.

Figure 1:
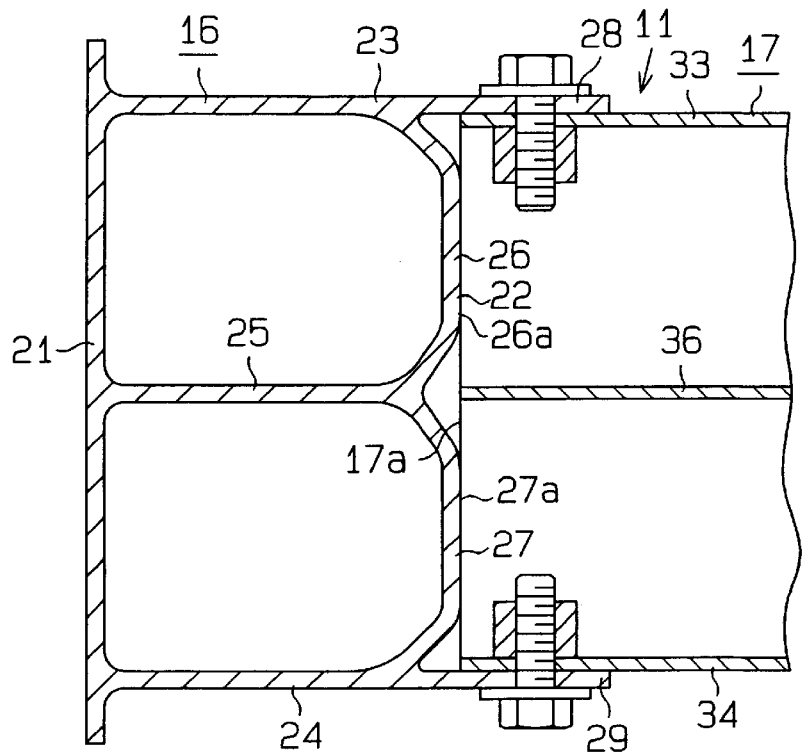
FIG. 1 is a cross-sectional view illustrating a shock absorbing member according to a first embodiment of the present invention.
Figure 3:
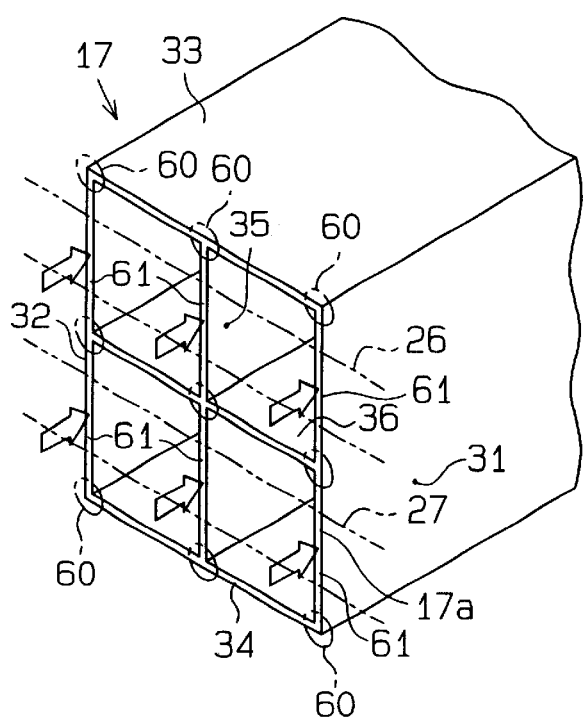
FIG. 3 is perspective view illustrating the shock absorbing member of FIG. 1.
Figure 4:
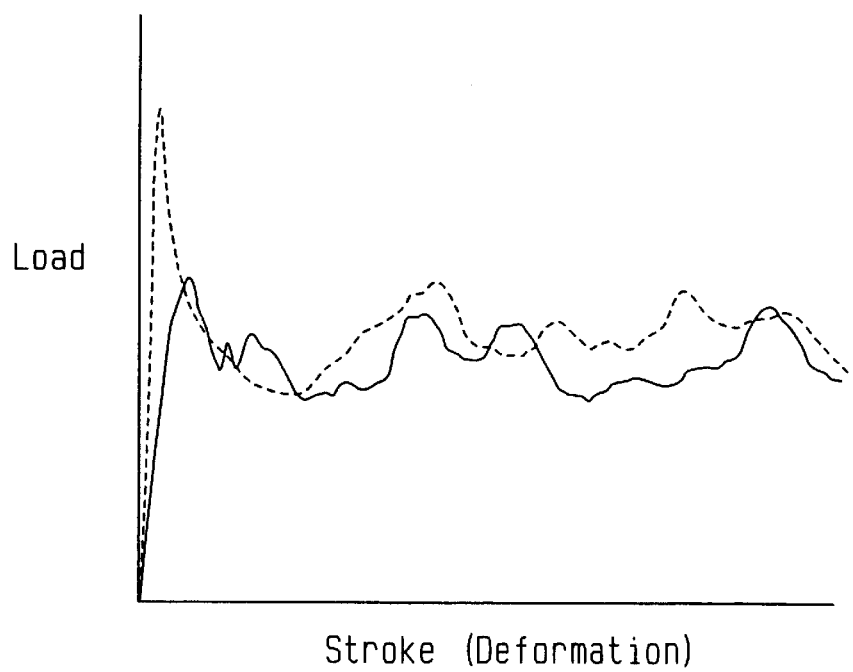
FIG. 4 is a graph showing the relationship between axial load and stroke of the shock absorbing member shown in FIG. 1.

The structure of the bumper reinforce 16, the structure of the crash boxes 17, and the structure for coupling the bumper reinforce 16 and the crash boxes 17 will now be described with reference to FIGS. 1 and 3. FIG. 1 is a cross-sectional view illustrating one of the crash boxes 17 and the bumper frame 11, and FIG. 3 is a perspective view illustrating one of the crash boxes 17.

As shown in FIG. 1, the bumper reinforce 16 has a substantially rectangular cross section and includes a front wall 21, a rear wall 22, an upper wall 23, and a lower wall 24. A partition 25 is located in and extends along the axis of the bumper reinforce 16. The partition 25 divides the space between the upper wall 23 and the lower wall 24 into substantially equal spaces. The bumper reinforce 16 is hollow and its cross section is constant along the axis. The bumper reinforce 16 is formed, for example, by extruding aluminum alloy.

The rear wall 22 is bent forward, or leftward as viewed 10 in FIG. 1, at portions coupled to the upper wall 23, the lower wall 24 and the partition 25. This forms bulges 26, 27 between the upper wall 23 and the partition 25 and between the lower wall 24 and the partition 25, respectively. The bulges 26, 27 protrude toward the crash boxes 17. The rear end face of the bulges 26, 27 form flat surfaces 26a, 27a, respectively. It is obvious that the bulges 26, 27 are formed when aluminum alloy is extruded for forming the bumper reinforce 16.

The upper wall 23 includes a pair of upper brackets 28, which extends rearward, and the lower wall 24 includes a pair of lower brackets 29, which extends rearward, Each upper bracket 28 and the corresponding lower bracket 29 correspond to one of the crash boxes 17. The upper and lower brackets 28, 29 are used for coupling the bumper reinforce 16 with the crash boxes 17.

As shown in FIG. 3, each crash box 17 is substantially rectangular and includes sidewalls 31, 32, an upper wall 33 and a lower wall 34. Each crash box 17 has a first partition 35 and a second partition 36. Each of the first and second partitions 35, 36 extends along one of orthogonal axes, the number of which is two in this embodiment. The cross section of each crash box 17 is constant, and the interior of each crash box 17 is divided into four spaces by the first and second partitions 35, 36. The crash boxes 17 are formed, for example, by extruding aluminum alloy.

As shown in FIG. 1, each crash box 17 is held between the corresponding pair of the upper and lower brackets 28, 29 of the bumper reinforce 16. Each crash box 17 is secured to the bumper reinforce 16 by fastening bolts to the upper and lower bracket 28, 29 and the crash box 17. At this time, edges 61 of an open end of each crash box 17 contact the flat surfaces 26a, 27a of the bulges 26, 27, which are formed in the rear wall 22.

The flat surface 26a of the upper bulge 26 is located between the upper wall 33 and the second partition 36 of each crash box 17 and extends perpendicular to that upper wall 33 and second partition 36. Therefore, the rear wall 22 of the bumper reinforce 16, or the bulge 26, faces and contacts the edges 61 of the sidewalls 31, 32 and the first partition 35 between the upper wall 33 and the second partition 36 of each crash box 17.

The flat surface 27a of the lower bulge 27 is located between the lower wall 34 and the second partition 36 of each crash box 17 and extends perpendicular to that lower wall 34 and second partition 36. Therefore, the rear wall 22 of the bumper reinforce 16, or the bulge 27, faces and contacts the edges 61 of the sidewalls 31, 32 and the first partition 35 between the lower wall 34 and the second partition 36 of each crash box 17.

The rear wall 22 of the bumper reinforce 16 only contacts the edges 61 of the sidewalls 31, 32, and of the first partition 35 of each crash box 17. That is, the rear wall 22 of the bumper reinforce 16 does not contact coupling portions 60 of the sidewalls 31, 32, the upper wall 33, the lower wall 34, the first partition 35, and the second partition 36, which are indicated by circles in FIG. 3. In other words, the rear wall 22 faces and contacts weak portions of the open end 17a of each crash box 17 but does not contact portions that are strong in the axial direction.

When shock is applied to the bumper reinforce 16, the shock is transmitted to the open end 17a of each crash box 17 through the bulges 26, 27. At this time, axial load is concentrated on the edges 61 of the open end 17a of each crash box 17. As shown by solid line in FIG. 4, each crash box 17 starts plastic deformation with relatively small load from portions that face and contact the flat surfaces 26a, 27a of the bulges 26, 27. Subsequently, each crash box 17 consecutively repeats buckle deformations along the axis with relatively small load and is shaped like a bellows. In this manner, each crash box 17 absorbs shock.

The above embodiment has the following advantages.

(1) The bumper reinforce 16 includes the bulges 26, 27, which face only the edges 61 of the open end 17a of each crash box 17. Therefore, when shock (load) is applied to the bumper reinforce 16, the shock is axially transmitted to part of the open end 17a, or the edges 61, from the bulges 26, 27. At this time, each crash box 17 starts plastic deformation with relatively small load from the edges 61 of the open end 17a. This reduces the initial axial load that is required for starting plastic deformation of the crash box 17. Also, axial load that is transmitted to the vehicle body (the side member 13) from the crash box 17 is also reduced, which lessen the shock experienced by passengers.

The starting point of axial plastic deformation is easily defined by forming the bulges 26, 27 on the bumper reinforce 16 to face part of the open end 17a (the edges 61). In other words, the crash boxes 17 do not require any additional machining. Therefore, the productivity is improved and the cost is reduced.

(2) The bumper reinforce 16 faces the weak portions (the edges 61) of the open end 17a of each crash box 17 and does not face portions having high axial strength, or the coupling portions 60 of the sidewalls 31, 32, the upper wall 33, the lower wall 34, the first partition 35, and the second partition 36. Therefore, when shock (load) is applied to the bumper reinforce 16, the shock is transmitted as axial load to the weak portions of the open end 17a of each crash box 17 from the bulges 26, 27. This reliably reduces the axial load for stating axial plastic deformation of the crash boxes 17.

The plastic deformation of each crash box 17 starts from the part that faces the bumper reinforce 16. Therefore, when axial load is applied to the crash boxes 17 due to, for example, a collision of the vehicle, plastic deformation of each crash box 17 starts from the part that faces the bumper reinforce 16 and progresses toward the vehicle body (the side member 13). The part of each crash box 17 that faces the vehicle body is located at the last stage of the shock absorption by the plastic deformation. Thus, the part of each crash box 17 that faces the vehicle body does not receive great load in the initial stages of the collision. In the first stages of collision, the part of each crash box 17 that faces the vehicle body is not bent. Therefore, the crash boxes 17 reliably absorb shock.

Figure 5:
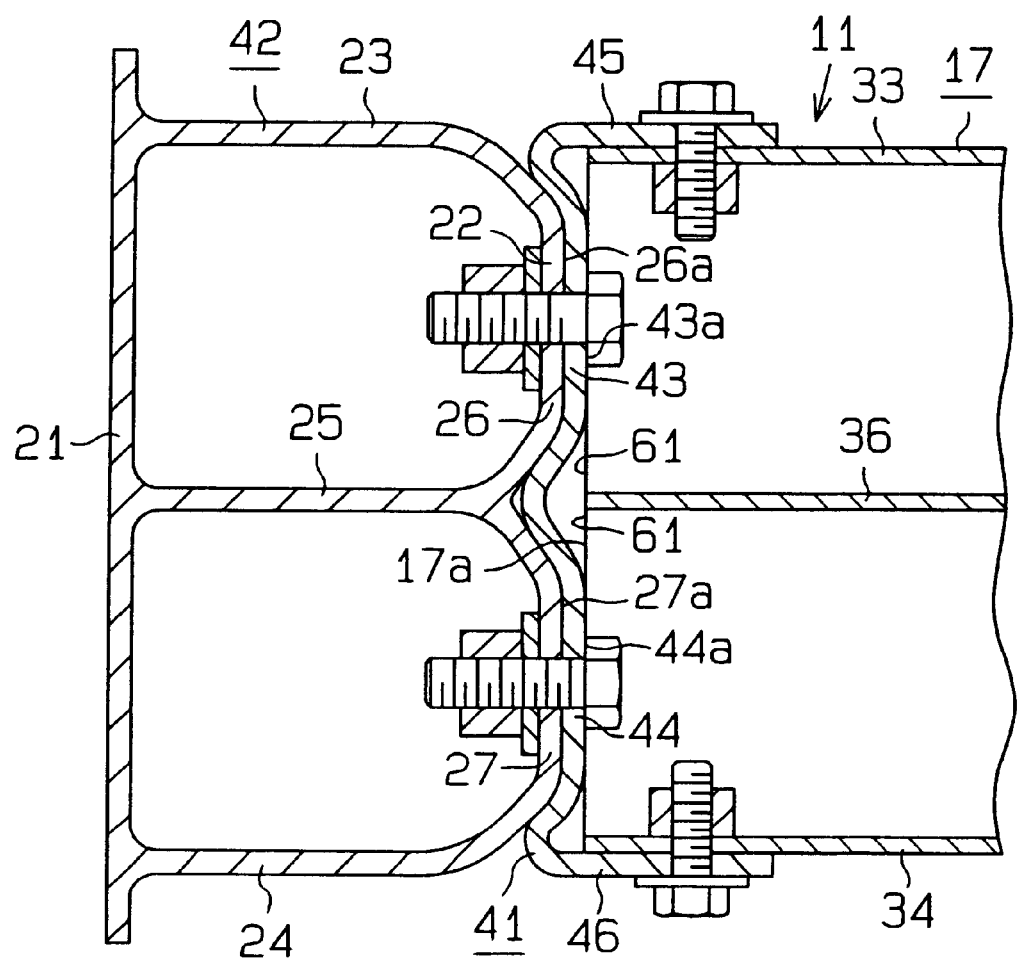
FIG. 5 is a cross-sectional view illustrating a shock absorbing member according to a second embodiment of the present invention.

A second embodiment will now be described with reference to FIG. 5. In the first embodiment, the bumper reinforce 16 is directly connected to the crash boxes 17. In the second embodiment, which is shown in FIG. 5, a joint plate 41 is located between a bumper reinforce 42 and each crash box 17. The bumper reinforce 42 has the same shape as the bumper reinforce 16 of the first embodiment except that the brackets 28, 29 are omitted in bumper reinforce 42. Each joint plate 41 includes projections, which are bulges 43, 44 in this embodiment and upper and lower brackets 45, 46. The bulges 43, 44 conform the bulges 26, 27. The upper and lower brackets 45, 46 are bent to hold the upper wall 33 and the lower wall 34 of the corresponding crash box 17.

The joint plate 41 and the bumper reinforce 42 are coupled to each other by fastening the bulges 26, 27 to the bulges 43, 44 by bolts and nuts. The crash box 17 is coupled to the joint plate 41 (and the bumper reinforce 42) through the upper and lower brackets 45, 46 by bolts and nuts. The edges 61 of the open end 17a of the crash box 17 contacts flat surfaces 43a, 44a of the bulges 43, 44.

The flat surface 43a of the bulge 43 is located between the upper wall 33 and the second partition 36 and extends substantially perpendicular to the upper wall 33 and the second partition 36. Therefore, the joint plate 41 faces the edges 61 of the sidewalls 31, 32 and of the first partition 35, at a location between the upper wall 33 and the second partition 36.

The flat surface 44a of the bulge 44 is located between the lower wall 34 and the second partition 36 and extends substantially perpendicular to the lower wall 34 and the second partition 36. Therefore, the joint plate 41 faces the edges 61 of the sidewalls 31, 32 and of the first partition 35, at a location between the lower wall 34 and the second partition 36.

In addition to advantage (3) of the first embodiment, the second embodiment has the following advantages.

(1) Each joint plate 41 includes the bulges 43, 44, which face only part of the open end 17a of the corresponding crash box 17. Therefore, when shock (load) is applied to the bumper reinforce 43, the shock is axially transmitted to part of the open end 17a, or the edges 61, from the bulges 43, 44. At this time, each crash box 17 starts plastic deformation with relatively small load from the edges 61 of the open end 17a. This reduces the initial axial load that is required for starting plastic deformation of the crash box 17. Also, the axial load that is transmitted to the vehicle body (by the side member 13) from the crash box 17 is also reduced, which lessen the shock experienced by passengers.

The starting point of axial plastic deformation is easily defined by forming the bulges 43, 44 on the joint plate 41 to face part of the open end 17a (the edges 61). In other words, the crash boxes 17 do not require any additional machining. Therefore, the productivity is improved and the cost is reduced.

(2) Each joint plate 41 faces the weak portions (the edges 61) of the open end 17a of the corresponding crash box 17 and does not face portions having high axial strength, or the coupling portions 60 of the sidewalls 31, 32, the upper wall 33, the lower wall 34, the first partition 35, and the second partition 36. This reliably reduces the axial load for stating axial plastic deformation of the crash boxes 17.

Figure 6:
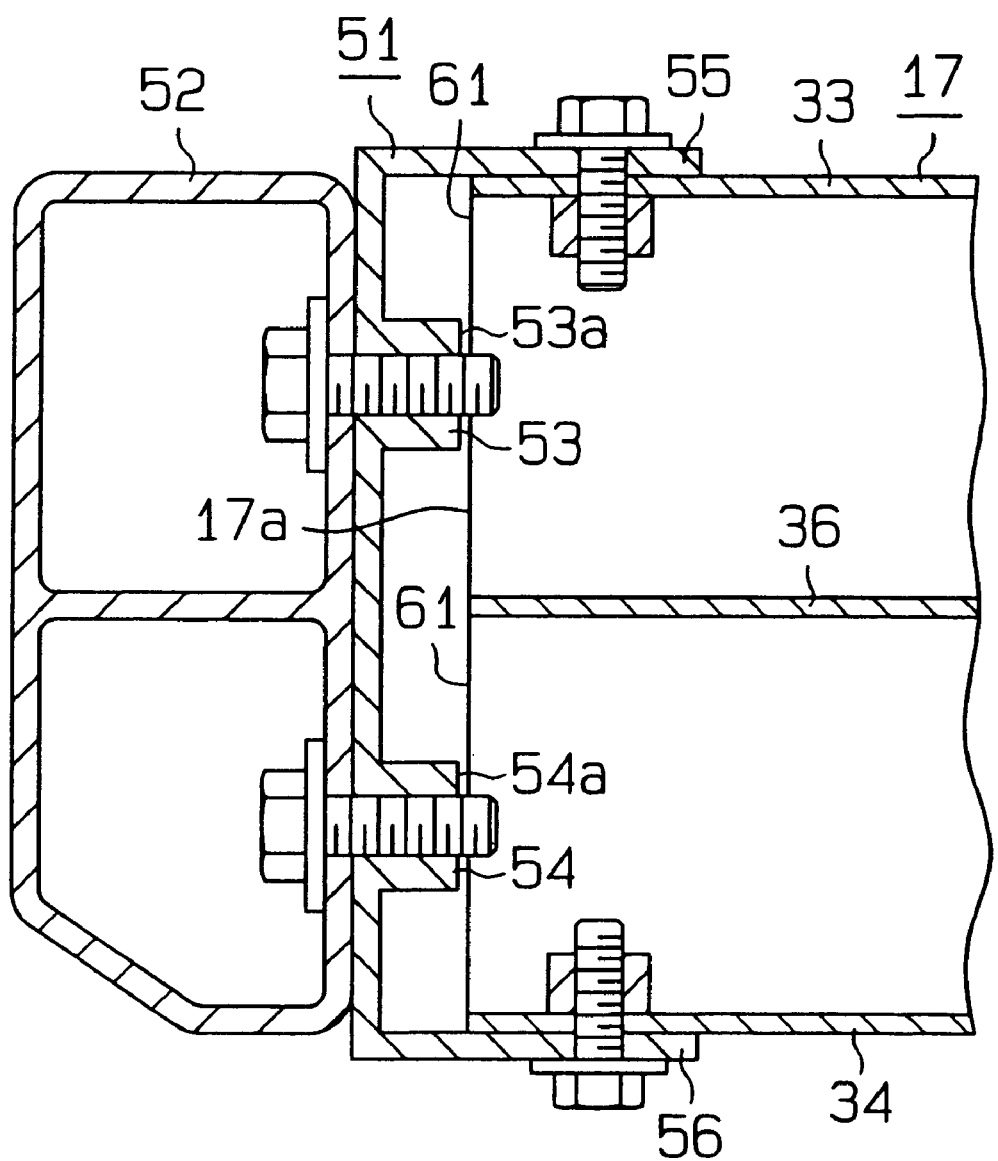
FIG. 6 is a cross-sectional view illustrating a shock absorbing member according to a third embodiment of the present invention.

FIG. 6 shows a third embodiment of the present invention. This embodiment includes a bumper reinforce 52 and shock transmitting members (joint plates 51). The bumper reinforce 52 is formed hollow arid includes walls, which extends linearly. Therefore, the wall that faces each joint plate 51 is flat. Each joint plate 51 corresponds to one of the crash boxes 17. A flat surface is formed on a part of each joint plate 51 that corresponds to the rear wall of the bumper reinforce 52. Two upper projections 53 and two lower projections 54 are formed on the rear wall of the joint plate 51, which faces the crash boxes 17. Each upper projection 53 and each lower projection 54 corresponds to one of the crash boxes 17. The projections 53, 54 have rectangular cross sections and face part of the open end 17a of the crash box 17, or the edges 61. Each joint plate 51 includes joint plate brackets 55, 56, which are bent to hold the upper wall 33 and the lower wall 34 of the corresponding crash box 17.

Each joint plate 51 is fastened to the bumper reinforce 52 at the projections 53, 54 by bolts and nuts. Each crash box 17 is coupled to the corresponding joint plate 51 (and the bumper reinforce 52) at the joint plate brackets 55, 56 by bolts and nuts. The open end 17a of each crash box 17 is located in the vicinity of the flat surfaces 53a, 54a of the corresponding projections 53, 54.

The flat surface 53a of cacti upper projection 53 is located between the upper wall 33 and the second partition 36 of the corresponding crash box 17 and extends substantially perpendicular to the upper wall 33 and the second partition 36. Therefore, each joint plate 51 faces the edges of the sidewalls 31, 32 and the edge of the first partition 35 at a part between the upper wall 33 and the second partition 36.

The flat surface 54a of each lower projection 54 is located between the lower wall 34 and the second partition 36 of the corresponding crash box 17 and extends perpendicular to the lower wall 34 and the second partition 36. Therefore, each joint plate 51 faces the sidewalls 31, 32 and the first partition 35 between the lower wall 34 and the second partition 36. The embodiment of FIG. 6 has the same advantages as the embodiments illustrated in FIGS. 1 to 5.

It should be apparent to those skilled in the art that the present invention may be embodied in many other specific forms without departing from the spirit or scope of the invention. Particularly, it should be understood that the invention may be embodied in the following forms.

The cross section of a bumper reinforce is not limited to the ones described in the illustrated embodiment. Also, a solid bumper reinforce may be used. That is, any bumper reinforce that has projections facing only part of the open end of the crash boxes 17 may be used.

As long as the cross section is constant, the crash box 17 may have any shape of cross section.

In the illustrated embodiments, the bumper reinforce 16 and the crash boxes 17 are made by extruding aluminum alloy. However, the bumper reinforce 16 and the crash boxes 17 may be formed with a different material.

In the illustrated embodiments, the crash boxes 17 are hollow and formed by extrusion. However, the crash boxes 17 may be formed through other methods, for example, by bending or coupling sheet metal.

In the illustrated embodiments, the bumper frame 11 and the side members 13 are coupled to each other by the radiator support 12. However, the bumper frame 11 may be directly coupled to the side members 13.

In the illustrated embodiment, the present invention is applied to the front bumper (the bumper frame 11) of the vehicle. However, the present invention may be applied to the rear bumper of a vehicle. In this case, the present invention has the same advantages as the illustrated embodiments.

In the illustrated embodiments, the present invention is applied to the front bumper (the bumper frame 11) of a vehicle. However, the present invention may be applied to a constructional material.

Therefore, the present examples and embodiments are to be considered as illustrative and not restrictive and the invention is not to be limited to the details given herein, but may be modified within the scope and equivalence of the appended claims.

What is claimed is:

1. A coupling structure of shock transmitting member and shock absorbing member, comprising:

a shock transmitting member, to which load is applied; and a hollow shock absorbing member, which has a substantially constant cross section, an open end, and an axis extending from the open end, wherein the shock absorbing member is plastically deformed in the axial direction for absorbing load applied to the shock transmitting member; and wherein the shock transmitting member includes a projection, which faces part of the open end of the shock absorbing member.

2. The coupling structure according to claim 1, wherein the projection of the shock transmitting member faces a weak portion of the open end of the shock absorbing member.

3. The coupling structure according to claim 1, wherein the shock absorbing member includes a plurality of walls, which are coupled by a plurality of coupling portions, wherein the shock absorbing member includes a plurality of edges, each of which is located between an adjacent pair of the coupling portions, wherein the projection of the shock transmitting member faces the edges at the open end of the shock absorbing member.

* * * * *